(12) United States Patent  (10) Patent No.: US 6,690,874 B2
Böhme et al.  (45) Date of Patent: Feb. 10, 2004

(54) OPTICAL WAVEGUIDE TERMINATION

(75) Inventors: Ralph Böhme, Mönchengladbach (DE); Reinhard Girbig, Mönchengladbach (DE); Hans-Werner Korporal, Duisburg (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/298,912

(22) Filed: Nov. 19, 2002

(65) Prior Publication Data

US 2003/0095774 A1 May 22, 2003

(30) Foreign Application Priority Data

Nov. 21, 2001 (DE) .......................................... 101 57 056

(51) Int. Cl.⁷ ................................................ G02B 6/00
(52) U.S. Cl. ........................................ 385/135; 385/136
(58) Field of Search ................................ 385/135, 136, 385/137, 138, 139, 140, 147

(56) References Cited

U.S. PATENT DOCUMENTS

| | | | | |
|---|---|---|---|---|
| 4,619,499 A | * | 10/1986 | Gerber | 385/135 |
| 4,687,289 A | * | 8/1987 | DeSanti | 385/135 |
| 5,069,523 A | * | 12/1991 | Finzel et al. | 385/135 |
| 5,187,766 A | * | 2/1993 | Finzel et al. | 385/135 |
| 5,218,664 A | * | 6/1993 | O'Neill et al. | 385/135 |
| 2002/0181925 A1 | * | 12/2002 | Hodge et al. | 385/135 |

FOREIGN PATENT DOCUMENTS

| | | |
|---|---|---|
| DE | 3942245 A1 | 6/1991 |
| DE | 19955271 A1 | 6/2001 |

* cited by examiner

*Primary Examiner*—Chandrika Prasad
(74) *Attorney, Agent, or Firm*—Sughrue Mion, PLLC

(57) ABSTRACT

An optical waveguide termination of an optical waveguide phase conductor, consisting of a tubular composite insulator, with a top fitting attached to one end and a bottom fitting attached to the opposite end, in which an optical cable is routed in a fluid-tight manner into the bottom fitting; the optical waveguides and/or cores of the optical cable are routed in the interior of the composite insulator to the top fitting; the optical waveguides and/or cores lie as a spare length in the top fitting; at least one splice cassette, for accommodating the splice joints of the optical fibres of the optical cable and of the optical fibres of the phase conductor, is disposed in the top fitting; and the interior of the composite insulator is filled, free from bubbles, with a liquid filling compound.

6 Claims, 1 Drawing Sheet

OPTICAL WAVEGUIDE TERMINATION

BACKGROUND OF THE INVENTION

The invention is based on a priority application DE 10157056.2 which is hereby incorporated by reference.

The invention relates to an optical waveguide termination of an optical waveguide phase conductor.

Described in DE 39 42 245 is an optical waveguide termination in which the end of the phase conductor is enclosed by a conductor clamp and at least one optical waveguide is routed out of the end of the phase conductor to the top fitting of the termination insulator, further within the latter to its bottom fitting and finally into a splice housing. The optical waveguide is encapsulated in the insulator and connected, in the splice housing, to a continuing optical waveguide. The insulator consists of a tube of glass-fibre-reinforced plastic, which is sheathed by a layer of silicone rubber and has a plurality of shields of silicone rubber disposed one above the other. The top and bottom fittings are flange-mounted on to the insulator and each comprise a splice housing. The optical waveguide is routed out of the upper splice housing in turns, via the glass-fibre-reinforced plastic tube of the insulator, to the lower splice housing. The interior of the insulator is filled with silicone rubber, the insulator thus being constructed as a post insulator.

The optical waveguide termination is fully works-prefabricated and it need only be set up and connected on site.

A disadvantage of this solution is that both the optical waveguides of the phase conductor and the continuing optical waveguides have to be spliced on site with the optical waveguides routed in the insulator and placed in the respective splice cassette.

This procedure is of considerable disadvantage particularly when more than one optical waveguide is accommodated in the phase conductor. Recently, up to 144 optical waveguides are provided in one phase conductor, a conductor wire being replaced in each case by a steel tube in the phase conductor. In the case of a phase conductor occupied by 144 optical waveguides, three tubes, each with 48 optical waveguides, have to be accommodated in one phase conductor. The splicing work, which has to be performed high up, including in unfavourable weather conditions, is very time-consuming and can extend over a period of up to a week.

The commissioning of a high-voltage installation is unnecessarily delayed as a result.

SUMMARY OF THE INVENTION

The object of the present invention is to improve the known optical waveguide termination such that the splicing work at the installation site is substantially reduced.

This object is achieved by an optical waveguide termination of an optical waveguide phase conductor, consisting of a tubular composite insulator, with a top fitting attached to one end and a bottom fitting attached to the opposite end, characterized by the following features:

a) an optical cable is routed in a fluid-tight manner into the bottom fitting, b) the optical waveguides and/or cores of the optical cable are routed in the interior of the composite insulator to the top fitting, c) the optical waveguides and/or cores lie as a spare length in the top fitting, d) at least one splice cassette, for accommodating the splice joints of the optical fibres of the optical cable and of the optical fibres of the phase conductor, is disposed in the top fitting, e) the interior of the composite insulator is filled, free from bubbles, with a liquid filling compound.

In addition to a substantial weight saving in comparison with the porcelain-based composite insulators used hitherto, the optical waveguide termination according to the invention also has the advantage that only one spliced joint need be produced high up for each optical fibre. Entry of the core or cores of the phase conductor into the bottom fitting, and of the optical waveguide connecting cable into the top fitting, is effected by means of standardized cable glands. Multiple seals are however also used for sealing of multifibre buffered tubes.

BRIEF DESCRIPTION OF THE DRAWINGS

The invention is described more fully with reference to the embodiment example represented schematically in the FIGURE.

DETAILED DESCRIPTION OF THE DRAWINGS

Figure 1:
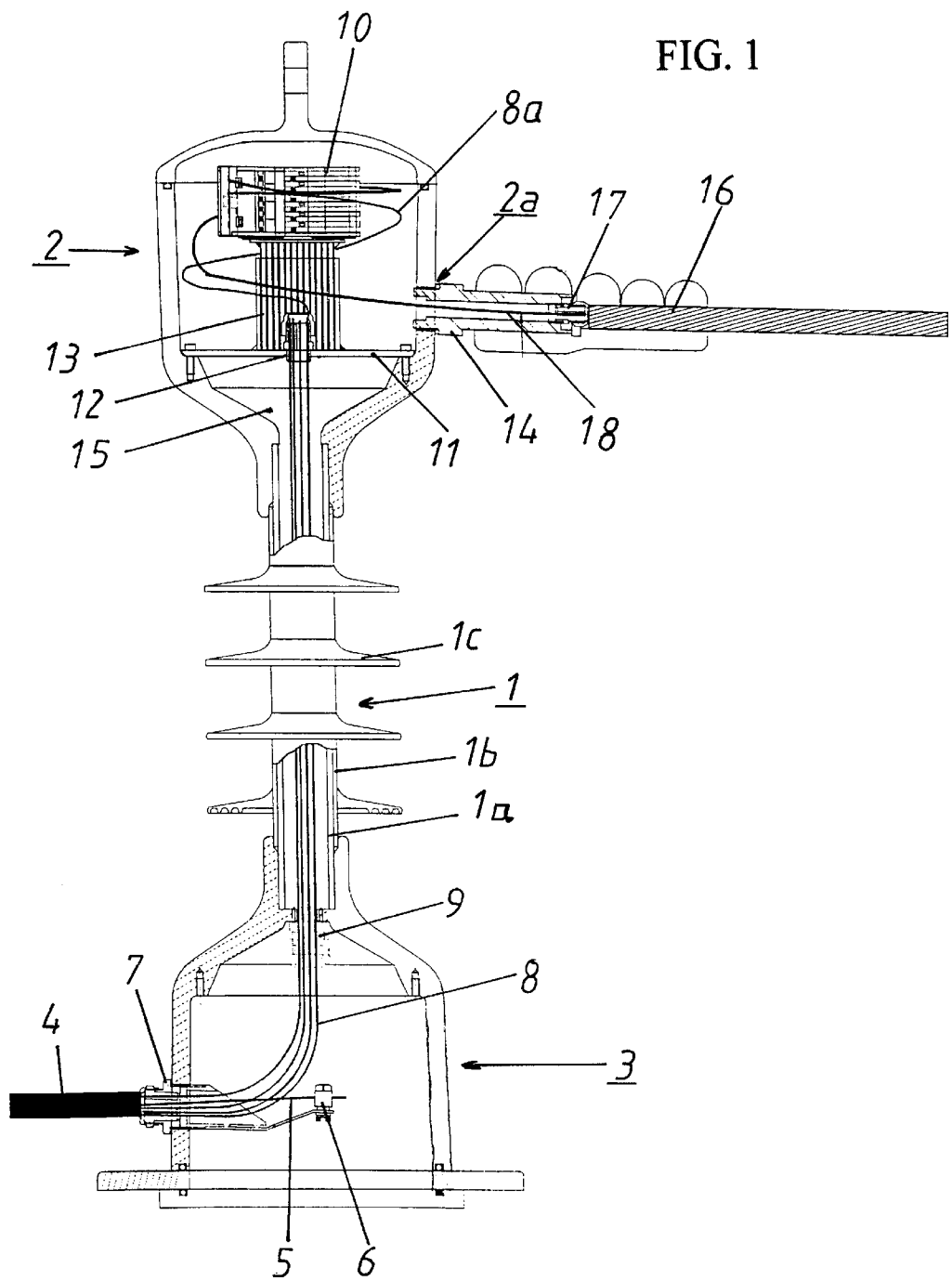
FIG. 1 shows an optical waveguide termination of an optical waveguide phase conductor according to the invention.

In FIG. 1 the optical waveguide termination consists of a composite insulator 1, composed of a tube 1a of glass-fibre-reinforced plastic, on to which is extruded a layer 1b of silicone rubber, and of several disk shields 1c which are moulded on to the layer 1b. Attached to the ends of the composite insulator 1 is a top fitting 2 and a bottom fitting 3. The top and bottom fittings can be constructed from few basic components for both functions.

The bottom fitting 3 serves to support the termination in an upright position and as an entry fitting and support for a metal-free optical waveguide connecting cable 4, the tension resistant central element 5 of which is supported within the bottom fitting 3, as shown by reference 6. The optical waveguide cable 4 is routed, in a fluid-tight manner, into the inside of the bottom fitting 3 through a standard cable gland 7. The cores 8—these are generally multifibre buffered tubes—are routed through the inside of the tube 1a to the top fitting 2. The cavity of the tube 1a is sealed downwardly by a further cable gland 9.

The top fitting 2 comprises, in its interior, a splice space which accommodates at least one splice cassette 10. The splice cassette 10 is preferably constructed so that up to 144 splices can be accommodated. It is possible for the splice cassettes to be cascaded for a further expansion stage.

The interior of the top fitting 2 is constructed so that there is room for a spare length 8a of the cores 8. The top fitting 2 also has a separating plate 11, which closes the cavity of the tube 1a against the interior of the top fitting 2. The cores 8 are routed, in a fluid-tight manner, through the separating plate 11, this being by means of a standard cable gland 12 with a multiple seal.

Attached to the separating plate 11 is a support 13, on the end of which the splice cassettes 10 are supported.

In the top fitting 2 there is an opening 2a, inserted in which there is a tension-resistant hollow pin 14, through which the core 18 or plurality of cores of the phase conductor 16 is or are routed into the inside of the top fitting 2.

The attachment of the phase conductor 16 on the termination is known per se and is not to be described more fully.

The core 18 of the phase conductor 16 is usually a so-called steel multifibre buffered tube, i.e., a plurality of optical waveguides, e.g. 48, are disposed inside a steel tube.

The steel multifibre buffered tubes 18 are routed through a cable gland 17, in a fluid-tight manner, into the hollow pin 14.

The interior of the tube 1a and the expansion space 15 below the separating plate 11 are filled, free from bubbles, with a silicone-based filling compound. The cavity and the expansion space 15 are filled following completion of the splicing work, but they can also be pre-filled in the works.

Since, in contrast with the prior art, there is only one splice cassette in the termination according to the invention, the splicing work performed on site, i.e., on the high-voltage mast, is reduced to a minimum. Due to the reduction to only one splice per optical waveguide, the total attenuation budget or path attenuation is lower.

For the purpose of connecting the phase conductor 16 to the termination, the end of the steel tube 18 is stepped, thereby uncovering the optical waveguides, the ends of which can then be spliced with the ends of the optical waveguides of the optical waveguide cable 4.

What is claimed is:

1. Optical waveguide termination of an optical waveguide phase conductor, consisting of a tubular composite insulator, with a top fitting attached to one end and a bottom fitting attached to the opposite end, whereby the following features:

a) an optical cable is routed in a fluid-tight manner into the bottom fitting, b) the optical waveguides and/or cores of the optical cable are routed in the interior of the composite insulator to the top fitting, c) the optical waveguides and/or cores lie as a spare length in the top fitting, d) at least one splice cassette, for accommodating the splice joints of the optical fibres of the optical cable and of the optical fibres of the phase conductor, is disposed in the top fitting, e) the interior of the composite insulator is filled, free from bubbles, with a liquid filling compound.

2. The optical waveguide termination according to claim 1, wherein the core or cores of the phase conductor is (are) routed, in a fluid-tight manner, into the top fitting, through an opening in the wall of the latter.

3. The optical waveguide termination according to claim 1, wherein the optical waveguides and/or cores of the optical cable are routed, through sealing arrangements, into the inside of the composite insulator and out of the latter.

4. The optical waveguide termination according to claim 1, wherein, in the top fitting, an expansion space is provided for the thermally induced expansion of the filling compound.

5. The optical waveguide termination according to claim 1, wherein the filling compound is a silicone elastomer.

6. The optical waveguide termination according to claim 1, wherein, there is provided within the top fitting a plate, separating the expansion space and the space in which the splice cassette is located, to which is attached a support for the splice cassettes.

\* \* \* \* \*